United States Patent
Fukada

(10) Patent No.: US 12,263,843 B2
(45) Date of Patent: Apr. 1, 2025

(54) CONTROL DEVICE FOR VEHICLE

(71) Applicant: TOYOTA JIDOSHA KABUSHIKI KAISHA, Toyota (JP)

(72) Inventor: Shunro Fukada, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/796,600

(22) Filed: Aug. 7, 2024

(65) Prior Publication Data
US 2025/0065880 A1    Feb. 27, 2025

(30) Foreign Application Priority Data
Aug. 21, 2023  (JP) ................. 2023-133765

(51) Int. Cl.
*B60W 30/182*    (2020.01)

(52) U.S. Cl.
CPC ... *B60W 30/182* (2013.01); *B60W 2510/1005* (2013.01); *B60W 2540/049* (2020.02); *B60W 2720/40* (2013.01)

(58) Field of Classification Search
CPC ....... B60W 30/182; B60W 2510/1005; B60W 2540/049; B60W 2720/40; B60W 60/00
See application file for complete search history.

(56) References Cited

U.S. PATENT DOCUMENTS

2018/0065618 A1    3/2018  Nishimine

FOREIGN PATENT DOCUMENTS

| CN | 108162964 B | * | 11/2020 | ............. B60K 6/365 |
|----|----|----|----|----|
| CN | 115503755 A | * | 12/2022 | ........... B60W 60/005 |
| JP | H11166613 A | | 6/1999 | |
| JP | 2018040426 A | | 3/2018 | |
| JP | 2021113595 A | | 8/2021 | |
| WO | WO-2021121555 A1 | * | 6/2021 | ............ B60W 30/14 |

* cited by examiner

*Primary Examiner* — Tisha D Lewis
(74) *Attorney, Agent, or Firm* — Hunton Andrews Kurth LLP

(57) ABSTRACT

The vehicle includes a prime mover, a propeller shaft that transmits a rotational output, a first drive wheel that transmits a rotational output without passing through the propeller shaft, a second drive wheel transmitted through the propeller shaft, a torque distribution unit, and a transmission device. The control device of the vehicle has an autonomous driving mode and a manual driving mode, when changing a gear ratio of the transmission device, the control device controls the torque distribution unit in such a manner that an amount of torque distribution transmitted to the second drive wheel becomes smaller than when the gear ratio of the transmission device is constant, and the amount of torque distribution transmitted to the second drive wheel when changing the gear ratio in the manual driving mode is smaller than the amount of torque distribution when changing the gear ratio in the autonomous driving mode.

5 Claims, 3 Drawing Sheets

CONTROL DEVICE FOR VEHICLE

CROSS-REFERENCE TO RELATED APPLICATION

This application claims priority to Japanese Patent Application No. 2023-133765 filed on Aug. 21, 2023, incorporated herein by reference in its entirety.

BACKGROUND

1. Technical Field

The present disclosure relates to control devices for vehicles.

2. Description of Related Art

For four-wheel drive vehicles, a technique of changing torque distribution between the front and rear wheels according to the traveling state is known in the art, as described in, for example, Japanese Unexamined Patent Application Publication No. 2021-113595 (JP 2021-113595 A). JP 2021-113595 A also proposes control of changing the torque distribution and the shift time in order to reduce shift shock.

SUMMARY

In recent years, autonomous driving control is sometimes used in four-wheel drive vehicles. In autonomous driving, however, control different from manual driving may be required for the torque distribution and the shift time. For example, in manual driving, the magnitude of acceleration according to the driver's intention may be prioritized over ride comfort. In autonomous driving, however, ride comfort may be prioritized as it is not necessary to control the acceleration at each moment to match the driver's expectation. In such a case, points to be considered regarding the torque distribution and the shift time vary between manual driving and autonomous driving. Therefore, there has been a demand for control of appropriately changing the torque distribution and the shift time according to whether the driving mode is manual driving or autonomous driving.

The present disclosure can be implemented in the following aspects.

A control device for a vehicle according to an aspect of the present disclosure, the vehicle including a prime mover, a propeller shaft that transmits a rotational output of the prime mover, a first drive wheel to which the rotational output is transmitted without passing through the propeller shaft, a second drive wheel to which the rotational output is transmitted through the propeller shaft, a torque distribution unit that distributes the rotational output to the first drive wheel and the second drive wheel, and a transmission device configured to change a rotational speed of the rotational output to transmit the rotational output to the first drive wheel and the propeller shaft, and configured to change the rotational speed at a plurality of gear ratios different from each other, wherein the control device includes an autonomous driving mode and a manual driving mode as driving modes of the vehicle, when changing a gear ratio of the transmission device, the control device controls the torque distribution unit in such a manner that an amount of torque distribution that is transmitted to the second drive wheel becomes smaller than when the gear ratio of the transmission device is constant, and the amount of torque distribution that is transmitted to the second drive wheel when changing the gear ratio in the manual driving mode is smaller than the amount of torque distribution that is transmitted to the second drive wheel when changing the gear ratio in the autonomous driving mode. With such a configuration, the control device changes the shift time and the amount of torque distribution that is transmitted to the second drive wheel according to whether the driving mode is the manual driving mode or the autonomous driving mode. For example, when shift shock is due to the amount of torque distribution that is transmitted to the second drive wheel, the control device controls the vehicle in consideration of the shock according to whether the driving mode is the manual driving mode or the autonomous driving mode. That is, the control device can appropriately change the amount of torque distribution time and the shift time according to whether the driving mode is the autonomous driving mode or the manual driving mode. In the vehicle control device of the above aspect, the shift time when changing the gear ratio in the manual driving mode may be shorter than the shift time when changing the gear ratio in the autonomous driving mode. With such a configuration, in the manual driving mode, the control device reduces shift shock when, for example, the shift shock is due to the amount of torque distribution that is transmitted to the second drive wheel. More specifically, in the manual driving mode, a short shift time may be required. Therefore, the control device reduces shift shock by reducing the amount of torque distribution that is transmitted to the second drive wheel. In the autonomous driving mode, the control device improves four-wheel drive traction performance by increasing the amount of torque distribution that is transmitted to the second drive wheel. Therefore, the control device can appropriately change the amount of torque distribution time and the shift time according to whether the driving mode is the autonomous driving mode or the manual driving mode. In the vehicle control device of the above aspect, the autonomous driving mode may include a manned autonomous driving mode that is used when there is an occupant in the vehicle, and an unmanned autonomous driving mode that is used when there is no occupant in the vehicle, the control device may control the amount of torque distribution in such a manner that the amount of torque distribution that is transmitted to the second drive wheel when changing the gear ratio in the unmanned autonomous driving mode is larger than the amount of torque distribution that is transmitted to the second drive wheel when changing the gear ratio in the manned autonomous driving mode, and the control device may control the shift time in such a manner that the shift time when changing the gear ratio in the unmanned autonomous driving mode is longer than the shift time when changing the gear ratio in the manned autonomous driving mode. With such a configuration, an appropriate amount of torque distribution and an appropriate shift time may vary between the manned autonomous driving mode and the unmanned autonomous driving mode. For example, in the manned autonomous driving mode, there may be cases where the shift time is reduced as an occupant desires fast movement. In such cases, the control device reduces shift shock compared to in the unmanned autonomous driving mode by reducing the amount of torque distribution that is transmitted to the second drive wheel. Therefore, the control device can appropriately change the amount of torque distribution and the shift time according to whether the driving mode is the manned autonomous driving mode or the unmanned autonomous driving mode. In the vehicle control device of the above aspect, the autonomous driving mode may include an unmanned autonomous driving mode that is used when there is no occupant in the vehicle, and the control device may control a shift time in such a manner that the shift time when changing the gear ratio in the manual driving mode is longer than the shift time when changing the gear ratio in the unmanned autonomous driving mode. With such a configuration, the control device performs shifting more quickly in the unmanned autonomous driving mode than in the manual driving mode. Since there is no occupant in the unmanned autonomous driving mode, it is not necessary to consider shift shock. The shift time can therefore be reduced in the unmanned autonomous driving mode. Accordingly, the control device can appropriately change the amount of torque distribution and the shift time in the unmanned autonomous driving mode. In the vehicle control device of the above aspect, the autonomous driving mode may include a manned autonomous driving mode that is used when there an occupant in the vehicle, the control device may control the amount of torque distribution in such a manner that the amount of torque distribution when changing the gear ratio in the manned autonomous driving mode is larger than the amount of torque distribution when changing the gear ratio in the unmanned autonomous driving mode, and the control device may control the shift time in such a manner that the shift time when changing the gear ratio in the manned autonomous driving mode is longer than the shift time when changing the gear ratio in the manual driving mode. With such a configuration, the control device performs shifting more slowly in the manned autonomous driving mode than in the manual driving mode and the unmanned autonomous driving mode. Moreover, the control device increases the amount of torque distribution that is transmitted to the second drive wheel in the manned autonomous driving mode as compared to in the manual driving mode and the unmanned autonomous driving mode. In the manned autonomous driving mode, shift shock cannot be predicted because an occupant is not a driver. Therefore, in the manned autonomous driving mode, the control device reduces shift shock and improves four-wheel drive traction performance to reduce occupant's discomfort caused by traveling of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
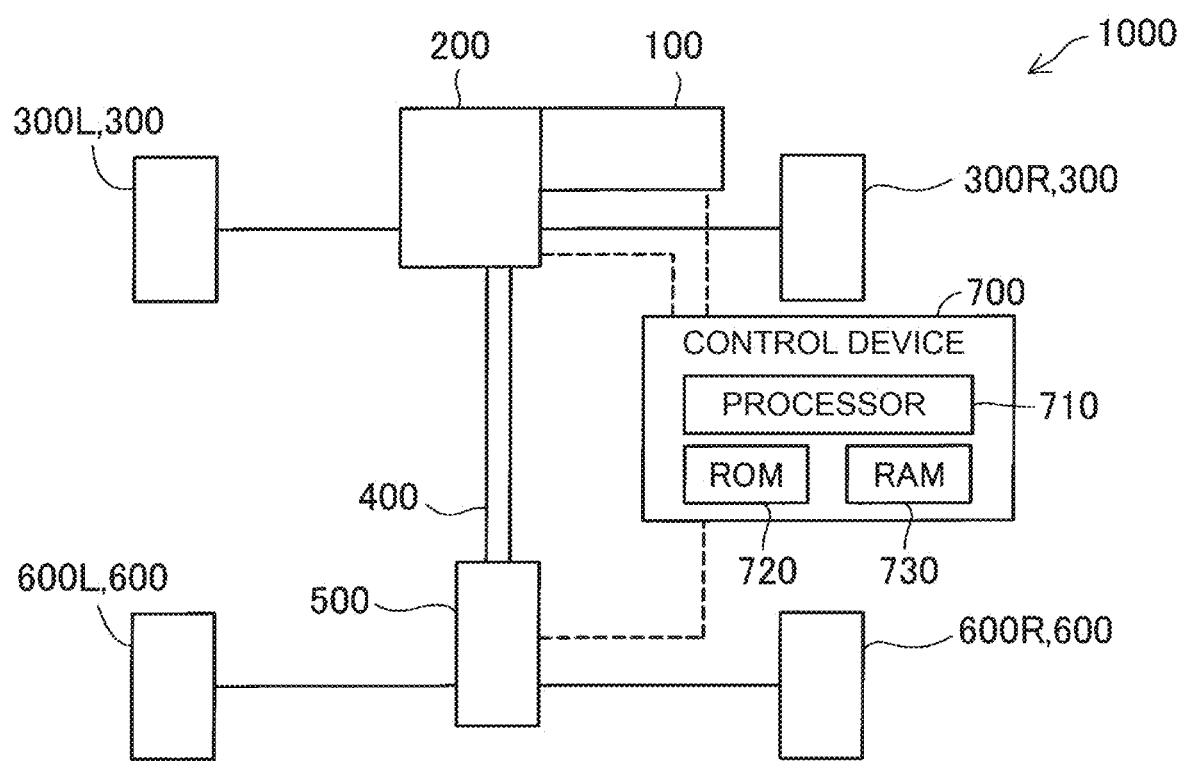
FIG. 1 is an illustration showing a configuration of a first embodiment.

FIG. 1 is an illustration showing a configuration of a first embodiment. A control device 700 is provided in a vehicle 1000. The vehicle 1000 is a four-wheel drive vehicle. Further, the vehicle 1000 has an autonomous driving mode and a manual driving mode as driving modes of the vehicle 1000. The driving mode will be described in detail later. In the following description, the configuration of the vehicle 1000 will be described before the description of the control device 700 of the vehicle 1000.

The vehicle 1000 includes a prime mover 100, a transmission device 200, a first drive wheel 300, a propeller shaft 400, a torque distribution unit 500, and a second drive wheel 600.

The prime mover 100 generates a rotational output of the vehicle 1000. For example, the prime mover 100 is an engine that generates a rotational output by burning fuel such as gasoline or gas oil. The rotational output is defined by the torque and rotational speed in the rotation of the prime mover 100. The rotational output of the prime mover 100 is controlled by a command of the control device 700. The rotational output is transmitted to the transmission device 200.

The transmission device 200 changes the rotational speed of the rotational output of the prime mover 100. Further, the transmission device 200 transmits the changed rotational output to the first drive wheel 300 and the propeller shaft 400. More specifically, the transmission device 200 includes a transmission and a transfer. The transmission device 200 changes the rotational speed of the rotational output of the prime mover 100 by changing the gear ratio by the transmission. Further, the transmission device 200 transmits the changed rotational output to the first drive wheel 300 and the propeller shaft 400 by transfer.

The transmission device 200 changes the gear ratio in accordance with an instruction from the control device 700. The transmission device 200 can change the rotational speed of the first drive wheel 300 and the propeller shaft 400 with different gear ratios. More specifically, the transmission device 200 can make the rotational speed of the rotational output distributed to the first drive wheel 300 and the propeller shaft 400 the same, and can make the rotational speed of the rotational output distributed to the first drive wheel 300 higher than the rotational speed of the rotational output distributed to the propeller shaft 400. Note that the time required for changing the gear ratio by the transmission device 200 is referred to as shift time. The longer the shift time, the more slowly the shift is performed, so that shift shock is reduced.

The first drive wheel 300 transmits the driving force to the road surface. More specifically, the first drive wheel 300 is a wheel that rotates according to the rotational speed of the rotational output transmitted from the transmission device 200 via the axle. That is, the rotational output transmitted to the first drive wheel 300 is transmitted without passing through the propeller shaft 400. The first drive wheel 300 includes a front wheel 300L and a front wheel 300R disposed on the left and right sides of the vehicle 1000. The driving force of the first drive wheel 300 is defined by the rotational output transmitted to the first drive wheel 300 and the diameter of the wheel of the first drive wheel 300.

The propeller shaft 400 transmits the rotational output of the prime mover 100. More specifically, the propeller shaft 400 transmits the rotational output distributed from the transmission device 200 to the torque distribution unit 500.

The torque distribution unit 500 distributes the rotational output to the first drive wheel 300 and the second drive wheel 600. More specifically, the torque distribution unit 500 transmits the rotational output distributed to the propeller shaft 400 by the transmission device 200 to the second drive wheel 600. The torque distribution unit 500 is, for example, an electronically controlled coupling of the multiplate clutch type. That is, the torque distribution unit 500 changes the rotational output for transmitting between the propeller shaft 400 and the second drive wheel 600 by changing the degree of engagement of the multi-plate clutch in accordance with an instruction from the control device 700. The distribution of the rotational output will be described in detail later.

The second drive wheel 600 transmits the driving force to the road surface. More specifically, the second drive wheel 600 is a wheel that is rotated by the rotational speed of the rotational output distributed based on the torque by the torque distribution unit 500. That is, the rotational output transmitted to the second drive wheel 600 is transmitted through the propeller shaft 400. The second drive wheel 600 includes a rear wheel 600L and a rear wheel 600R disposed on the left and right sides of the vehicle 1000. The driving force of the second drive wheel 600 is determined by the rotational output transmitted to the second drive wheel 600 and the diameter of the wheel of the second drive wheel 600.

The second drive wheel 600 further rotates with respect to the axle in a state where the rotational output is not distributed by the torque distribution unit 500. That is, the second drive wheel 600 rotates even in a state where the driving force is not transmitted to the road surface. In this case, the vehicle 1000 is in a two-wheel drive state that travels only by the driving force of the first drive wheel 300.

The control device 700 controls the vehicle 1000. The control device 700 includes a processor 710, a ROM 720, and a RAM 730. ROM 720 is a read-only semiconductor memory and stores a control program for controlling the vehicle 1000 in advance. RAM 730 is a memory that can be read and written, and stores data required for controlling the vehicle 1000. The processor 710 implements various functions by loading and executing a control program stored in a ROM 720 into a RAM 730. The functions of the processor 710 will be described in detail later.

The control device 700 has an autonomous driving mode and a manual driving mode as driving modes of the vehicle 1000. The control device 700 controls the prime mover 100, the transmission device 200, and the torque distribution unit 500 according to the driving mode.

The manual driving mode is a driving mode in which at least a part of the control related to the traveling of the vehicle 1000 is executed by the determination and the operation of the driver. For example, it means a driving mode in which driving of levels 0 to 2 is implemented among the driving levels of levels 0 to 5 defined in the Society of Automotive Engineers (SAE).

The autonomous driving mode is a driving mode in which at least a part of the control related to the traveling of the vehicle 1000 is automatically executed regardless of the judgment of the driver. For example, the autonomous driving mode means a driving mode in which the driving of the levels 3 to 5 is realized in SAE. In the autonomous driving mode, the traveling of the vehicle 1000 is automatically controlled by using the detection result of a sensor for detecting a situation around the vehicle 1000 such as an imaging camera, a millimeter-wave radar, a Light Detection and Ranging, or a Laser Imaging Detection and Ranging (LiDAR).

The autonomous driving mode includes a manned autonomous driving mode used when there is an occupant in the vehicle 1000 and an unmanned autonomous driving mode used when there is no occupant in the vehicle 1000. Note that the occupant in the manned autonomous driving mode is not a driver. In the manned autonomous driving mode, the driving is performed under the control of the vehicle 1000.

The control device 700 distributes the rotational output by controlling the torque distribution unit 500. As described above, the rotational output of the prime mover 100 is transmitted to the first drive wheel 300 and the propeller shaft 400 by the transmission device 200. Further, the rotational output transmitted to the propeller shaft 400 is transmitted to the second drive wheel 600 via the torque distribution unit 500. The control device 700 determines the distribution of the rotational output of the first drive wheel 300 and the second drive wheel 600 by adjusting the rotational output transmitted to the second drive wheel 600 by the torque distribution unit 500.

The control device 700 distributes the rotational output based on the amount of torque distribution. The amount of torque distribution is an absolute value of the torque transmitted to the second drive wheel 600. That is, the control device 700 changes the rotational output transmitted between the propeller shaft 400 and the second drive wheel 600 by the torque distribution unit 500 based on the amount of torque distribution. At this time, the rotational output distributed to the first drive wheel 300 is changed according to the rotational output distributed to the second drive wheel 600.

For example, an example in which the magnitude of the torque of the first drive wheel 300 and the magnitude of the torque of the second drive wheel 600 are 50:50 when the amount of torque distribution is maximized will be described. The control device 700 cuts off the transmission of the rotational output by the torque distribution unit 500, so that the amount of torque distribution can be set to 0. When the amount of torque distribution is 0, the torque distribution amount is the smallest. Therefore, in a case where the amount of torque distribution is minimized, since the rotational output is transmitted only to the first drive wheel 300, the magnitude of the torque of the first drive wheel 300 and the second drive wheel 600 becomes a relationship of 100:0. Therefore, the control device 700 determines the rotational output to be distributed to the first drive wheel 300 and the second drive wheel 600 by changing the amount of torque distribution by the torque distribution unit 500. When the magnitude of the torque of the first drive wheel 300 and the magnitude of the torque of the second drive wheel 600 are 100:0, the vehicle 1000 is in a two-wheel drive state. When both the first drive wheel 300 and the second drive wheel 600 have a torque magnitude, the vehicle 1000 is in a four-wheel drive state.

When changing the gear ratio of the transmission device 200, the control device 700 further controls the torque distribution unit 500 so that the amount of torque distribution that is transmitted to the second drive wheel 600 is smaller than when the gear ratio of the transmission device 200 is constant. For example, when the gear ratio of the transmission device 200 is constant and the magnitude of the torque between the first drive wheel 300 and the second drive wheel 600 is 50:50, and the gear ratio is changed, the control device 700 adjusts the relationship of the magnitude of the torque between 51:49 and 100:0.

With such a configuration, the control device 700 reduces shift shock caused when the torque is transmitted to the second drive wheel 600 as compared to when the torque distribution unit 500 does not reduce the amount of torque distribution. Further, the control device 700 increases the traction performance of the vehicle 1000 by causing the vehicle 1000 to travel by four-wheel driving when the gear ratio of the transmission device 200 is constant by the torque distribution unit 500.

Figure 2:
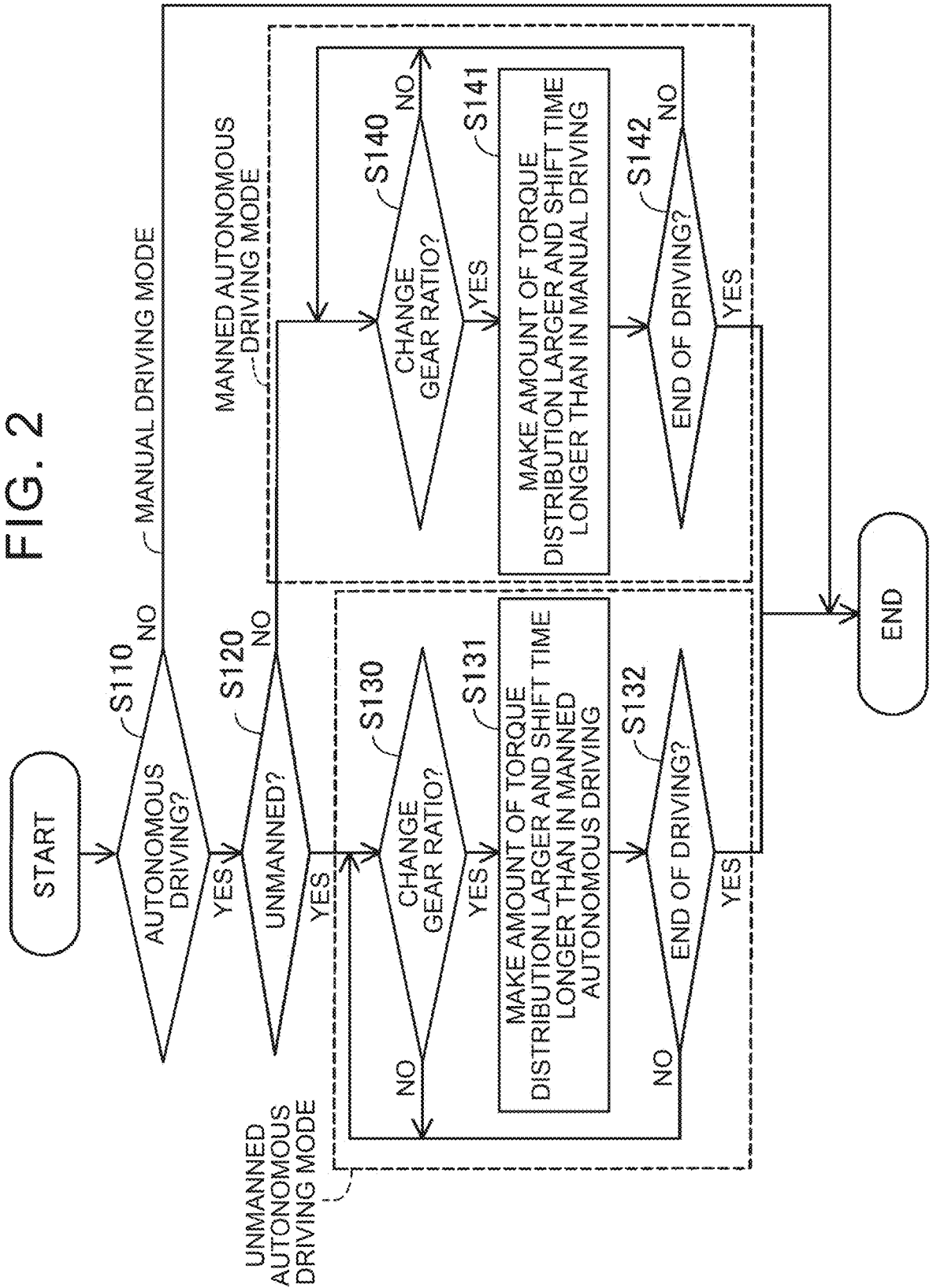
FIG. 2 is a flowchart showing a process of a control device of the first embodiment.

FIG. 2 is a flowchart illustrating processing of the control device 700 according to the first embodiment. The processor 710 of the control device 700 in FIG. 1 starts processing in response to switching of the driving mode of the vehicle 1000 or starting of the engine.

In S110 of FIG. 2, the processor 710 of the control device 700 determines the driving mode. That is, the processor 710 advances the process to S120 when the driving mode is the autonomous driving mode. When the driving mode is the manual driving mode, the processor 710 ends the processing.

In S120 of FIG. 2, the processor 710 of the control device 700 determines the presence or absence of an occupant. That is, if there is no occupant in the vehicle 1000, the processor 710 advances the process to S130. The processor 710 advances the process to S140 when there is an occupant in the vehicle 1000.

In S130 of FIG. 2, the processor 710 of the control device 700 determines whether the gear ratio of the transmission device 200 is changed. For example, in the autonomous driving mode, the processor 710 changes the gear ratio by acceleration at the time of starting, deceleration due to regulation of the vehicle speed, or the like. When the gear ratio is changed, the processor 710 advances the process to S131. When the gear ratio is not changed, the processor 710 returns the process to S130.

In S131 of FIG. 2, the processor 710 of the control device 700 controls the amount of torque distribution that is transmitted to the second drive wheel 600 when the gear ratio is changed in the unmanned autonomous driving mode to be larger than the amount of torque distribution that is transmitted to the second drive wheel 600 when the gear ratio is changed in the manned autonomous driving mode.

In addition, the processor 710 makes the shift time when changing the gear ratio in the unmanned autonomous driving mode longer than the shift time when changing the gear ratio in the manned autonomous driving mode. That is, the processor 710 slowly changes the gear ratio by the transmission device 200 as compared to when it changes the gear ratio in the manned autonomous driving mode. With such a configuration, the shift shock in the unmanned autonomous driving mode is reduced as compared to in the manned autonomous driving mode.

In S132 of FIG. 2, the processor 710 of the control device 700 determines the end of driving. That is, the processor 710 returns the process to S130 when the prime mover 100 is activated. When the processor 710 confirms that the prime mover 100 is stopped, the process ends.

In S140 of FIG. 2, the processor 710 of the control device 700 determines whether the gear ratio of the transmission device 200 is changed. The determination is performed in the same manner as in S130. When the gear ratio is changed, the processor 710 advances the process to S141. When the gear ratio is not changed, the processor 710 returns the process to S140.

In S141 of FIG. 2, the processor 710 of the control device 700 controls the amount of torque distribution so that the amount of torque distribution that is transmitted to the second drive wheel 600 when changing the gear ratio in the manned autonomous driving mode is greater than the amount of torque distribution that is transmitted to the second drive wheel 600 when changing the gear ratio in the manual driving mode.

In addition, the processor 710 controls the shift time in such a manner that the shift time when changing the gear ratio in the manned autonomous driving mode is longer than the shift time when changing the gear ratio in the manual driving mode. That is, the processor 710 slowly changes the gear ratio by the transmission device 200 as compared to when it changes the gear ratio in the manual driving mode. With such a configuration, shift shock in the manned autonomous driving mode is reduced as compared to in the manual driving mode.

In S142 of FIG. 2, the processor 710 of the control device 700 determines the end of driving. That is, the processor 710 returns the process to S140 when the prime mover 100 is activated. When the processor 710 confirms that the prime mover 100 is stopped, the process ends.

As described above, in the case where the manual driving mode and the autonomous driving mode are compared, the amount of torque distribution that is transmitted to the second drive wheel 600 in the case where the gear ratio is changed in the manual driving mode is smaller than the amount of torque distribution that is transmitted to the second drive wheel 600 in the case where the gear ratio is changed in the autonomous driving mode.

Further, the shift time when changing the gear ratio in the manual driving mode is shorter than the shift time when changing the gear ratio in the autonomous driving mode.

With such a configuration, the control device 700 changes the shift time and the amount of torque distribution that is transmitted to the second drive wheel 600 according to whether the driving mode is the manual driving mode or the autonomous driving mode. For example, when shift shock is due to the amount of torque distribution that is transmitted to the second drive wheel 600, the control device 700 controls the vehicle 1000 in consideration of the shock according to whether the driving mode is the manual driving mode or the autonomous driving mode. That is, the control device 700 can appropriately change the amount of torque distribution and the shift time according to whether the driving mode is the autonomous driving mode or the manual driving mode.

More specifically, in the manual driving mode, a short shift time may be required, and therefore, the control device 700 reduces the amount of torque distribution that is transmitted to the second drive wheel 600, thereby reducing shift shock. In the autonomous driving mode, the control device 700 increases the amount of torque distribution that is transmitted to the second drive wheel 600, thereby improving the four-wheel drive traction performance. Therefore, the control device 700 can appropriately change the amount of torque distribution and the shift time according to whether the driving mode is the autonomous driving mode or the manual driving mode.

In addition, an appropriate amount of torque distribution and an appropriate shift time may vary between the manned autonomous driving mode and the unmanned autonomous driving mode. For example, in a manned autonomous driving mode, the shift time may be reduced because an occupant desires fast movement. In such a case, the control device 700 reduces the amount of torque distribution that is transmitted to the second drive wheel 600 to reduce shift shock as compared in the unmanned autonomous driving mode. Therefore, in the autonomous driving mode, the control device 700 can appropriately change the amount of torque distribution and the shift time according to whether the driving mode is the manned autonomous driving mode or the unmanned autonomous driving mode.

Figure 3:
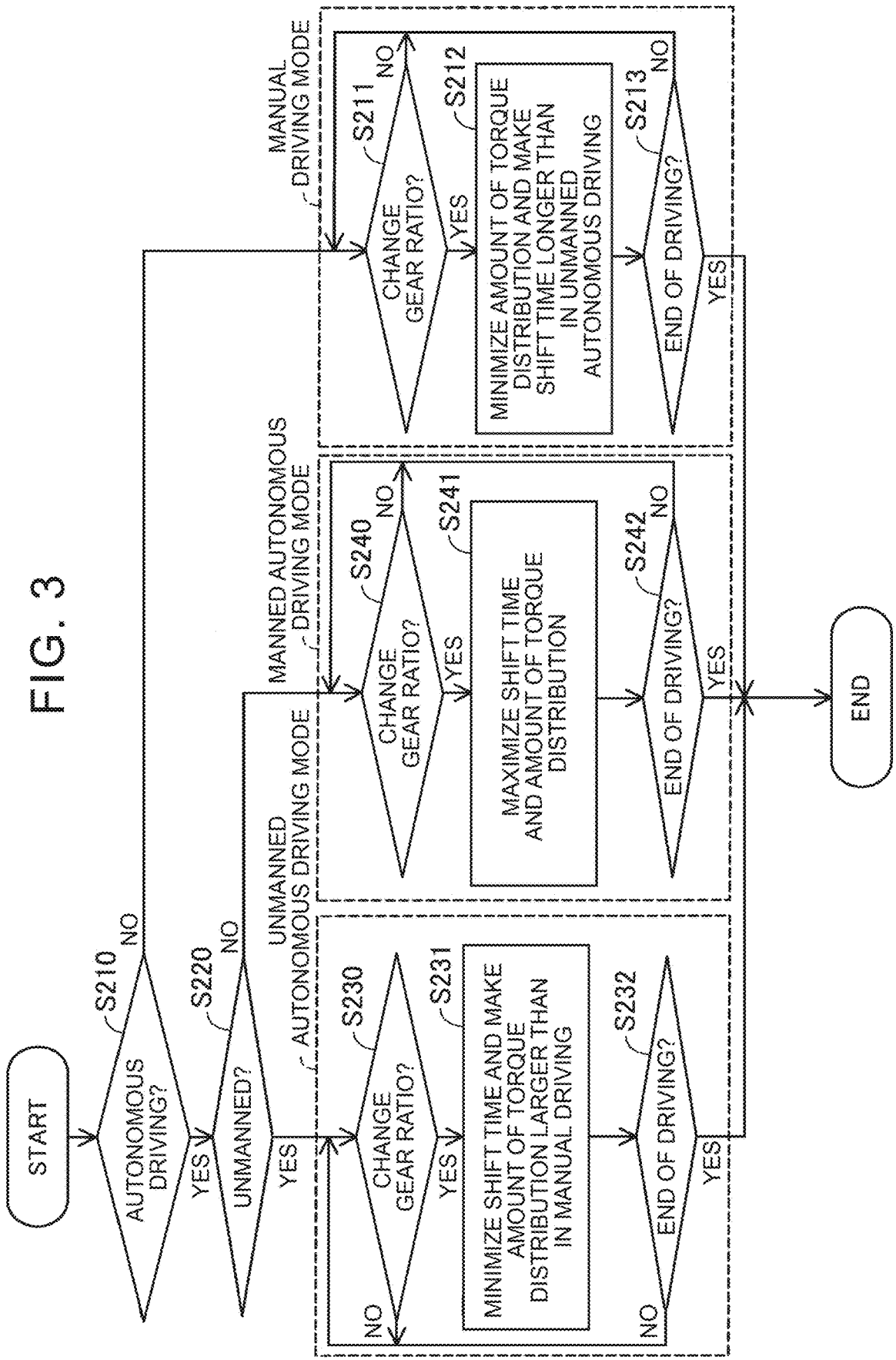
FIG. 3 is a flowchart showing a process that is performed by a control device of a second embodiment.

FIG. 3 is a flowchart illustrating processing of the control device 700 according to the second embodiment. The configuration of the second embodiment is the same as that of the first embodiment of FIG. 1. In the processing of the control device 700 according to the second embodiment, the processing is started in response to switching of the driving mode of the vehicle 1000 or starting of the engine, as in the first embodiment.

In S210 of FIG. 3, the processor 710 of the control device 700 determines the driving mode. That is, the processor 710 advances the process to S220 when the driving mode is the autonomous driving mode. When the driving mode is the manual driving mode, the processor 710 advances the process to S211.

In S211 of FIG. 3, the processor 710 of the control device 700 determines whether the gear ratio of the transmission device 200 is changed. For example, the processor 710 of the control device 700 performs the determination by receiving an acceleration or deceleration command by the operation of the driver. When the gear ratio is changed, the processor 710 advances the process to S212. In S211, when the gear ratio is not changed, the processor 710 returns the process to S211.

In S212 of FIG. 3, the processor 710 of the control device 700 controls the amount of torque distribution that is transmitted to the second drive wheel 600 when the gear ratio is changed in the manual driving mode to be smaller than the amount of torque distribution that is transmitted to the second drive wheel 600 when the gear ratio is changed in the unmanned autonomous driving mode. Note that, by the processing of the other driving mode described later, the amount of torque distribution in the manual driving mode is the smallest among the driving modes.

In addition, the processor 710 controls the shift time in such a manner that the shift time when changing the gear ratio in the manual driving mode is longer than the shift time when changing the gear ratio in the unmanned autonomous driving mode. That is, the processor 710 changes the gear ratio in the unmanned autonomous driving mode faster than the gear ratio in the manual driving mode.

In S213 of FIG. 3, the processor 710 of the control device 700 determines the end of driving. That is, the processor 710 returns the process to S211 when the prime mover 100 is activated. When the processor 710 confirms that the prime mover 100 is stopped, the process ends.

In S220 of FIG. 3, the processor 710 of the control device 700 determines the presence or absence of an occupant. That is, if there is no occupant in the vehicle 1000, the processor 710 advances the process to S230. The processor 710 advances the process to S240 when there is an occupant in the vehicle 1000.

In S230 of FIG. 3, the processor 710 of the control device 700 determines whether the gear ratio of the transmission device 200 is changed. The determination is performed in the same manner as in S130 of the first embodiment. When the gear ratio is changed, the processor 710 advances the process to S231. When the gear ratio is not changed, the processor 710 returns the process to S230.

In S231 of FIG. 2, the processor 710 of the control device 700 controls the amount of torque distribution that is transmitted to the second drive wheel 600 when the gear ratio is changed in the unmanned autonomous driving mode to be larger than the amount of torque distribution that is transmitted to the second drive wheel 600 when the gear ratio is changed in the manual driving mode. However, the processor 710 controls the amount of torque distribution that is transmitted to the second drive wheel 600 when the gear ratio is changed in the unmanned autonomous driving mode to be smaller than the amount of torque distribution that is transmitted to the second drive wheel 600 when the gear ratio is changed in the manned autonomous driving mode.

In addition, the processor 710 controls the shift time in such a manner that the shift time when changing the gear ratio in the unmanned autonomous driving mode is shorter than the shift time when changing the gear ratio in the manned autonomous driving mode or the manual driving mode. That is, the shift time in the unmanned autonomous driving mode is the shortest among the driving modes.

In S232 of FIG. 3, the processor 710 of the control device 700 determines the end of driving. That is, the processor 710 returns the process to S230 when the prime mover 100 is activated. When the processor 710 confirms that the prime mover 100 is stopped, the process ends.

In S240 of FIG. 3, the processor 710 of the control device 700 determines whether the gear ratio of the transmission device 200 is changed. The determination is performed in the same manner as in S230. When the gear ratio is changed, the processor 710 advances the process to S241. When the gear ratio is not changed, the processor 710 returns the process to S240.

In S241 of FIG. 3, the processor 710 of the control device 700 controls the amount of torque distribution that is transmitted to the second drive wheel 600 when the gear ratio is changed in the manned autonomous driving mode to be larger than the amount of torque distribution that is transmitted to the second drive wheel 600 when the gear ratio is changed in the unmanned autonomous driving mode. That is, the amount of torque distribution that is transmitted in the manned autonomous driving mode is the largest among the driving modes.

In addition, the processor 710 controls the shift time in such a manner that the shift time when changing the gear ratio in the manned autonomous driving mode is longer than the shift time when changing the gear ratio in the manual driving mode. That is, the shift time in the manned autonomous driving mode is the longest among the driving modes.

In S242 of FIG. 2, the processor 710 of the control device 700 determines the end of driving. That is, the processor 710 returns the process to S240 when the prime mover 100 is activated. When the processor 710 confirms that the prime mover 100 is stopped, the process ends.

With such a configuration, in the unmanned autonomous driving mode, the control device 700 shifts the speed more quickly than in the manual driving mode. Since there is no occupant in the unmanned autonomous driving mode, it is not necessary to consider shift shock. Therefore, the shift time can be reduced in the unmanned autonomous driving mode. Therefore, the control device 700 can appropriately change the amount of torque distribution and the shift time in the unmanned autonomous driving mode.

Furthermore, in the manned autonomous driving mode, the control device 700 performs the shift more slowly than the manual driving or the unmanned autonomous driving. In addition, in the manned autonomous driving mode, the control device 700 increases the amount of torque distribution that is transmitted to the second drive wheel 600 than in the manual driving mode or the unmanned autonomous driving mode. In the manned autonomous driving mode, since the occupant is not a driver, shift shock cannot be predicted. Therefore, in the manned autonomous driving mode, the control device 700 reduces shift shock and improves the wheel drive traction performance to reduce occupant's discomfort due to traveling of the vehicle 1000.

(1) In the above embodiment, the control device 700 may not change the shift time when the transmission device 200 changes the gear ratio. That is, when the transmission device 200 changes the gear ratio, the control device 700 may change only the amount of torque distribution that is transmitted to the second drive wheel 600. For example, the control device 700 can reduce shift shock even when only the amount of torque distribution that is transmitted to the second drive wheel 600 is reduced.

(2) In the above embodiment, the autonomous driving mode may include any one of a manned autonomous driving mode and an unmanned autonomous driving mode. For example, in the flow chart of FIG. 2, since the process of S120 is not performed, the process of the control device 700 may be performed only by the two processes of the process of the unmanned autonomous driving mode and the process of the manual driving mode.

(3) In the above embodiment, the rotational output of the prime mover 100 is transmitted to the first drive wheel 300 and the propeller shaft 400 by the transmission device 200. This transfer may be performed directly or indirectly. For example, the rotational output may be directly transmitted by a dry clutch, such as a manual transmission, or indirectly transmitted by a fluid clutch, such as an automatic transmission.

(4) In the above embodiment, the prime mover 100 exemplifies an engine. However, the prime mover 100 may generate a rotational output by a motor.

The present disclosure is not limited to the above-described embodiments, and can be realized with various configurations without departing from the spirit thereof. For example, the technical features of the embodiments corresponding to the technical features in the respective embodiments described in the Summary can be appropriately replaced or combined in order to solve some or all of the above-described problems or to achieve some or all of the above-described effects. In addition, if the technical features are not described as essential in the present specification, they can be deleted as appropriate.

What is claimed is:

1. A control device for a vehicle, the vehicle including
a prime mover,
a propeller shaft that transmits a rotational output of the prime mover,
a first drive wheel to which the rotational output is transmitted without passing through the propeller shaft,
a second drive wheel to which the rotational output is transmitted through the propeller shaft,
a torque distribution unit that distributes the rotational output to the first drive wheel and the second drive wheel, and
a transmission device configured to change a rotational speed of the rotational output to transmit the rotational output to the first drive wheel and the propeller shaft, and configured to change the rotational speed at a plurality of gear ratios different from each other, wherein:
the control device includes an autonomous driving mode and a manual driving mode as driving modes of the vehicle;
when changing a gear ratio of the transmission device, the control device controls the torque distribution unit in such a manner that an amount of torque distribution that is transmitted to the second drive wheel becomes smaller than when the gear ratio of the transmission device is constant; and
the amount of torque distribution that is transmitted to the second drive wheel when changing the gear ratio in the manual driving mode is smaller than the amount of torque distribution that is transmitted to the second drive wheel when changing the gear ratio in the autonomous driving mode.

2. The control device according to claim 1, wherein a shift time when changing the gear ratio in the manual driving mode is shorter than a shift time when changing the gear ratio in the autonomous driving mode.

3. The control device according to claim 2, wherein:
the autonomous driving mode includes a manned autonomous driving mode that is used when there is an occupant in the vehicle, and an unmanned autonomous driving mode that is used when there is no occupant in the vehicle;
the control device controls the amount of torque distribution in such a manner that the amount of torque distribution that is transmitted to the second drive wheel when changing the gear ratio in the unmanned autonomous driving mode is larger than the amount of torque distribution that is transmitted to the second drive wheel when changing the gear ratio in the manned autonomous driving mode; and
the control device controls the shift time in such a manner that the shift time when changing the gear ratio in the unmanned autonomous driving mode is longer than the shift time when changing the gear ratio in the manned autonomous driving mode.

4. The control device according to claim 1, wherein:
the autonomous driving mode includes an unmanned autonomous driving mode that is used when there is no occupant in the vehicle; and
the control device controls a shift time in such a manner that the shift time when changing the gear ratio in the manual driving mode is longer than the shift time when changing the gear ratio in the unmanned autonomous driving mode.

5. The control device according to claim 4, wherein:
the autonomous driving mode includes a manned autonomous driving mode that is used when there an occupant in the vehicle;
the control device controls the amount of torque distribution in such a manner that the amount of torque distribution when changing the gear ratio in the manned autonomous driving mode is larger than the amount of torque distribution when changing the gear ratio in the unmanned autonomous driving mode; and
the control device controls the shift time in such a manner that the shift time when changing the gear ratio in the manned autonomous driving mode is longer than the shift time when changing the gear ratio in the manual driving mode.

* * * * *